United States Patent
Hachiman et al.

(10) Patent No.: US 12,188,578 B2
(45) Date of Patent: Jan. 7, 2025

(54) VALVE

(71) Applicant: FUJIKIN INCORPORATED, Osaka (JP)

(72) Inventors: Souta Hachiman, Osaka (JP); Keisuke Ishibashi, Osaka (JP); Tadayuki Yakushijin, Osaka (JP); Yusei Horikawa, Osaka (JP); Michio Yamaji, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 9 days.

(21) Appl. No.: 18/038,903

(22) PCT Filed: Aug. 26, 2021

(86) PCT No.: PCT/JP2021/031343
§ 371 (c)(1),
(2) Date: May 25, 2023

(87) PCT Pub. No.: WO2022/113447
PCT Pub. Date: Jun. 2, 2022

(65) Prior Publication Data
US 2024/0019045 A1    Jan. 18, 2024

(30) Foreign Application Priority Data

Nov. 27, 2020   (JP) ................................ 2020-196961

(51) Int. Cl.
*F16K 41/10*   (2006.01)
*F16K 1/04*    (2006.01)
(Continued)

(52) U.S. Cl.
CPC ................ *F16K 41/10* (2013.01); *F16K 1/04* (2013.01); *F16K 1/44* (2013.01); *F16K 31/1221* (2013.01); *F16K 35/06* (2013.01)

(58) Field of Classification Search
CPC .......... F16K 1/482; F16K 1/485; F16K 41/10; F16K 41/103; F16B 7/042
See application file for complete search history.

(56) References Cited

U.S. PATENT DOCUMENTS 3,787,023 A * 1/1974 Shufflebarger .......... F16K 41/10
                                                251/335.3
4,911,412 A * 3/1990 Danko .................... F16K 31/50
                                                251/264

(Continued)

FOREIGN PATENT DOCUMENTS

JP    S62-34275 U    2/1987
JP    H08-121433 A    5/1996
(Continued)

OTHER PUBLICATIONS

International Search Report mailed Nov. 9, 2021, issued for PCT/JP2021/031343 and English translation thereof.

*Primary Examiner* — Reinaldo Sanchez-Medina
(74) *Attorney, Agent, or Firm* — Locke Lord LLP

(57) ABSTRACT

To provide a valve that is easily assembled and has a low possibility of breakage of a coupled section even when the valve has to be downsized or subjected to a large load. A valve has a valve unit and a drive unit, is configured to include: a first recess that is a recess formed in either one of a second stem or a first stem and is formed with a groove at a predetermined position on an inner circumferential surface of the recess; a second recess formed in another one thereof; a stem pin accommodated in both of the recesses; an urging member that is accommodated in the first recess and urges the stem pin to the other side; a sidewall through-hole that penetrates a sidewall of the second recess horizontally; and a ball that enters the sidewall through-hole.

8 Claims, 6 Drawing Sheets

(51) Int. Cl.
  *F16K 1/44* (2006.01)
  *F16K 31/122* (2006.01)
  *F16K 35/06* (2006.01)

(56) References Cited

U.S. PATENT DOCUMENTS

| | | | |
|---|---|---|---|
| 8,132,784 B2* | 3/2012 | Ferrero | F16K 31/041 |
| | | | 251/291 |
| 8,602,385 B2* | 12/2013 | Evertz | F16K 31/05 |
| | | | 403/379.5 |
| 2010/0276011 A1* | 11/2010 | Spitzer | F16K 41/103 |
| | | | 137/627 |
| 2019/0003330 A1 | 1/2019 | Morimoto | |
| 2021/0190118 A1* | 6/2021 | Stuut | E04B 1/585 |

FOREIGN PATENT DOCUMENTS

| | | |
|---|---|---|
| JP | 2020-51447 A | 4/2020 |
| WO | 2017/145365 A1 | 8/2017 |

\* cited by examiner

-- Prior Art --

-- Prior Art --

VALVE

TECHNICAL FIELD

The present invention relates to a valve that has a characteristic in a connection mechanism between a stem shaft of a valve unit and a drive shaft of a drive unit.

BACKGROUND ART

Valves for controlling fluids are used in various industrial fields. Each of these valves is mainly configured to include: a valve unit that is formed with a fluid channel and is opened/closed by abutment/separation of a valve body and a valve seat, respectively; and a drive unit that controls movement of the valve body. The valve body of the valve unit is attached to a tip of the stem shaft, and this stem shaft is coupled to the drive shaft of the drive unit by any of various connection mechanisms.

In a valve described in PTL 1, as illustrated in FIG. 6, a valve seat 110 is formed in a valve box 101 that is formed with channels 108, 109, and a valve body 105 that abuts/separates from the valve seat 110 is attached to a lower end of a lower valve rod 104. The lower valve rod 104 is arranged in bellows 127.

An upper valve rod 103 that is attached to a rotary operation handle 118 is projected downward, and rotary movement of the rotary operation handle 118 is converted into vertical movement of the upper valve rod 103 by valve rod lifting screws 117a, 117b. A lower valve rod fitting recess 121 is formed in an a lower surface of a lower end of the upper valve rod 103, an annular groove 104a is formed in an upper end portion of the lower valve rod 104, a parallel pin 122 is driven horizontally (in a direction from a front surface toward a back surface in FIG. 6) so as to be fitted into the annular groove 104a, and the upper valve rod 103 and the lower valve rod 104 are thereby coupled.

In a valve described in PTL 2, as illustrated in FIG. 7, a valve seat 203 is attached to a valve body 202 that is formed with a first channel 202b and a second channel 202c, and a diaphragm presser 206 that deforms a diaphragm 204 abutting/separating from the valve seat 203 is attached to a lower end of a stem 221.

In a drive unit 201B, a supply fluid DG is taken in from a supply port 232 and fed into a cylinder 243, causing a piston member 241 to move vertically and a piston rod 224 to move vertically. The piston rod 224 and stem 221 are coupled by tightening a male screw 260 that is formed in a lower end portion of the piston rod 224 and a female screw 250 that is formed in an upper end portion of the stem 221.

CITATION LIST

Patent Literature

PTL 1: JPS62-34275U
PTL 2: JP2020-51447A

SUMMARY OF INVENTION

Technical Problem

In regard to coupling by the parallel pin that is used in the valve of PTL 1, the thin parallel pin couples the upper valve rod and the lower valve rod. Thus, in the case where the valve has to be downsized or subjected to a large load, the parallel pin is possibly broken. Since coupling by the screws used in the valve of PTL 2 is in tightening form, thickness for forming the screws has to be taken into consideration. Consequently, a screw diameter of the male screw has to be reduced inevitably, and, in the case where the valve has to be downsized or subjected to the large load similarly to the case of the parallel pin type, the male screw is possibly broken. The case of the screw type further has a problem of loosening of the screws.

The invention has been made in view of such points and therefore has a purpose of providing a valve capable of handling downsizing of the valve and having a connection structure with a low possibility of breakage of a coupled section.

Solution to Problem

The invention (1) is a valve having: a valve unit that includes a first stem having a valve body in a lower end portion, the valve body abutting/separating from a valve seat in a valve body that is formed with a fluid channel, so as to respectively allow/disallow a flow of a fluid; and a drive unit that includes a second stem connected to the first stem by a connection mechanism and is attached to the valve unit, and characterized in that the connection mechanism is configured to include: a first recess that is a recess formed in either one of the second stem and the first stem and is formed with a groove at a predetermined position of an inner circumferential surface; a second recess that is formed in another one of the second stem and the first stem; a stem pin that is accommodated in the first recess and the second recess; an urging member that urges the stem pin accommodated in the first recess to the other side; a sidewall through-hole that penetrates a sidewall of the second recess horizontally; and a ball that enters the sidewall through-hole, and that, when the second stem is inserted to a predetermined position in the first recess, the ball is fitted into the groove, the stem pin is urged by the urging member and arranged at a predetermined position, the ball is held and fixed between a surface of the groove and a side surface of the stem pin, and the second stem and the first stem are connected and fixed.

In the valve of the invention (1), the stem pin and the ball are used as main elements of the connection mechanism, and a load on a coupled section is mainly a compressive load on the ball. Since resistance of the ball against compressive stress is extremely high, the valve including such a connection mechanism can adequately handle downsizing and a high load requirement. In addition, since coupling can be achieved with a single touch by simply fitting the second stem and the first stem to each other, assembly is extremely easy. Furthermore, in the case of a screw type, a tool locking section (such as a width across flat) is required for tightening. However, the valve (1) of the invention does not require such processing, which enables a cost reduction.

The invention (2) is the valve in the invention (1) that is further formed with a through-hole in the second stem or the first stem, the through-hole being connected to and penetrating the second recess horizontally, and in which the second stem and the first stem are disconnected by a push pin inserted in the through-hole. The stem pin has a small-diameter section on the through-hole side and further has a large-diameter section continuous with the small-diameter section, a contact surface with the ball at the time when the second stem and the first stem are connected and fixed is a side surface of the large-diameter section, when the push pin is inserted in the through-hole, a side surface of the push pin pushes an end surface of the stem pin on the small-diameter section side to the urging member side, the ball in contact with the stem pin moves away from the side surface of the large-diameter section, and the second stem and the first stem are disconnected.

In the invention (2), coupling can be canceled simply by inserting the push pin in the through-hole and applying a force to the second stem and the first stem in a direction to separate from each other. Thus, compared to the conventional connection mechanisms of a pin type or the screw type, it is possible to achieve labor-savings for maintenance. In the case of a parallel pin type or the screw type, a parallel pin or the stem may need to be replaced due to damage. Meanwhile, in the invention (2), since replacement of the stem pin or the ball is not essentially required, maintenance cost is reduced. Thus, and periodical maintenance can reliably be performed at low cost.

The invention (3) is the valve of the invention (1) or (2) in which the groove is an annular groove.

According to the invention (3), the groove is the annular groove and can easily be formed by lathe turning. Thus, manufacturing cost can be reduced.

The invention (4) is the valve in any one of the inventions (1) to (3), in which the valve is a bellows valve including bellows.

In the case where the valve body is inspected and replaced for maintenance of the bellows valve, the first stem and the second stem are decoupled first, and then the bellows have to be removed. This is very labor-intensive work. In the case of the bellows valve in the invention (4), the first stem and the second stem can be decoupled with a single touch. Thus, the work can be reduced even in the case of the bellows valve that requires the difficult maintenance work.

Advantageous Effects of Invention

According to the invention, it is possible to provide the valve that is easily assembled and has a low possibility of breakage of the coupled section even when the valve has to be downsized or subjected to the large load.

DESCRIPTION OF EMBODIMENTS

A detailed description will hereinafter be made on an embodiment of the invention on the basis of the drawings. The following embodiment is essentially a preferred illustrative example and is not intended to limit the invention, applications thereof, or the scope of the application thereof.

Figure 1:
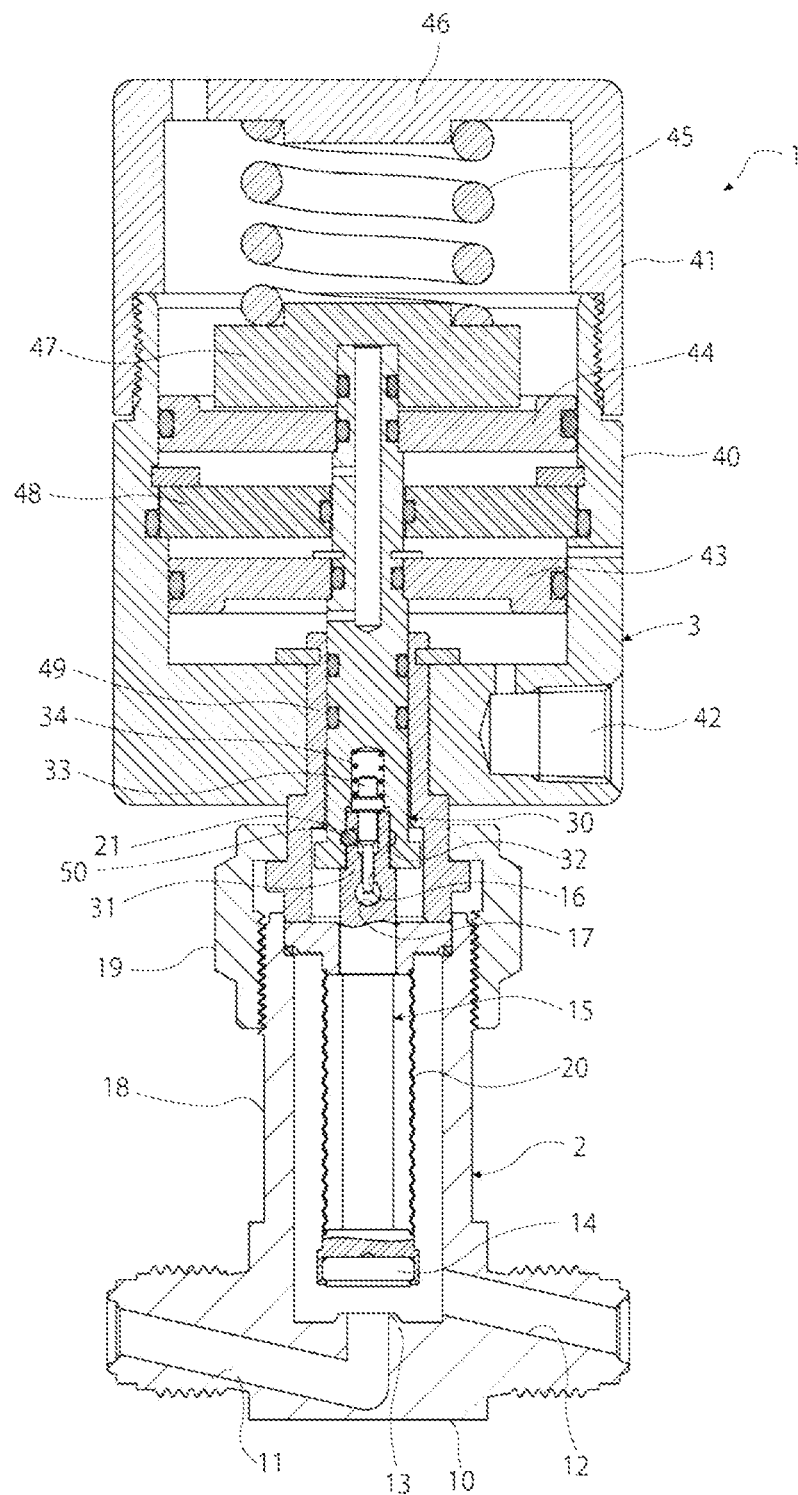
FIG. 1 is a partial vertical cross-sectional view of a valve according to an embodiment of the invention.

FIG. 1 illustrates a first embodiment of the valve according to the invention.

A valve 1 illustrated in FIG. 1 has a valve unit 2 and a drive unit 3. The valve unit 2 has: a valve body 10 that is formed with a fluid inlet channel 11, a fluid outlet channel 12, and a valve seat 13 therein; and, inside a bonnet 18 that is formed on top of the valve body 10, a first stem 15 with a valve body 14 being attached to a tip thereof and bellows 20 that hermetically seal the first stem 15.

The drive unit 3 includes: piston members 43, 44 arranged inside a space by a casing having a lower casing 40 and an upper casing 41 that are joined by screws; a compression coil spring 45; a compression coil spring receiving member 47; a cylinder head 48; and a second stem 30. The lower casing 40 is bored to have a drive fluid supply port 42, through which a drive fluid is introduced. The compression coil spring 45 is held between the compression coil spring receiving member 47 and a ceiling section 46 of the upper casing 41.

The valve unit 2 and the drive unit 3 are coupled by an intermediate connection cylinder 49 and a locknut 19.

A groove 32 is formed on an inner circumferential surface of a first recess 31, which is a recess formed in the second stem 30. A second recess 16 is formed in an upper end portion of the first stem 15. A stem pin 33 is arranged in a space that is formed by the first recess 31 and the second recess 16. An urging member 34, which is accommodated in the first recess 31 and urges the stem pin 33 to the first stem 15 side, is arranged, a sidewall through-hole 21, which penetrates a sidewall of the second recess 16 horizontally, is formed, and a ball 50, which enters the sidewall through-hole 21, is disposed. Although the number of the sidewall through-hole 21 is not particularly limited, three thereof are provided in this embodiment. The ball 50 is preferably a steel ball having a high wear-resistant property. A through-hole 17 that is connected to the second recess 16 and penetrates horizontally is formed in the first stem 15. This through-hole 17 is used to decouple the second stem 30 and the first stem 15, but can also be used for assembly thereof.

A description will be made on how to assemble the second stem 30 and the first stem 15 by the connection mechanism of the invention with reference to FIG. 2 to FIG. 3.

Figure 2:
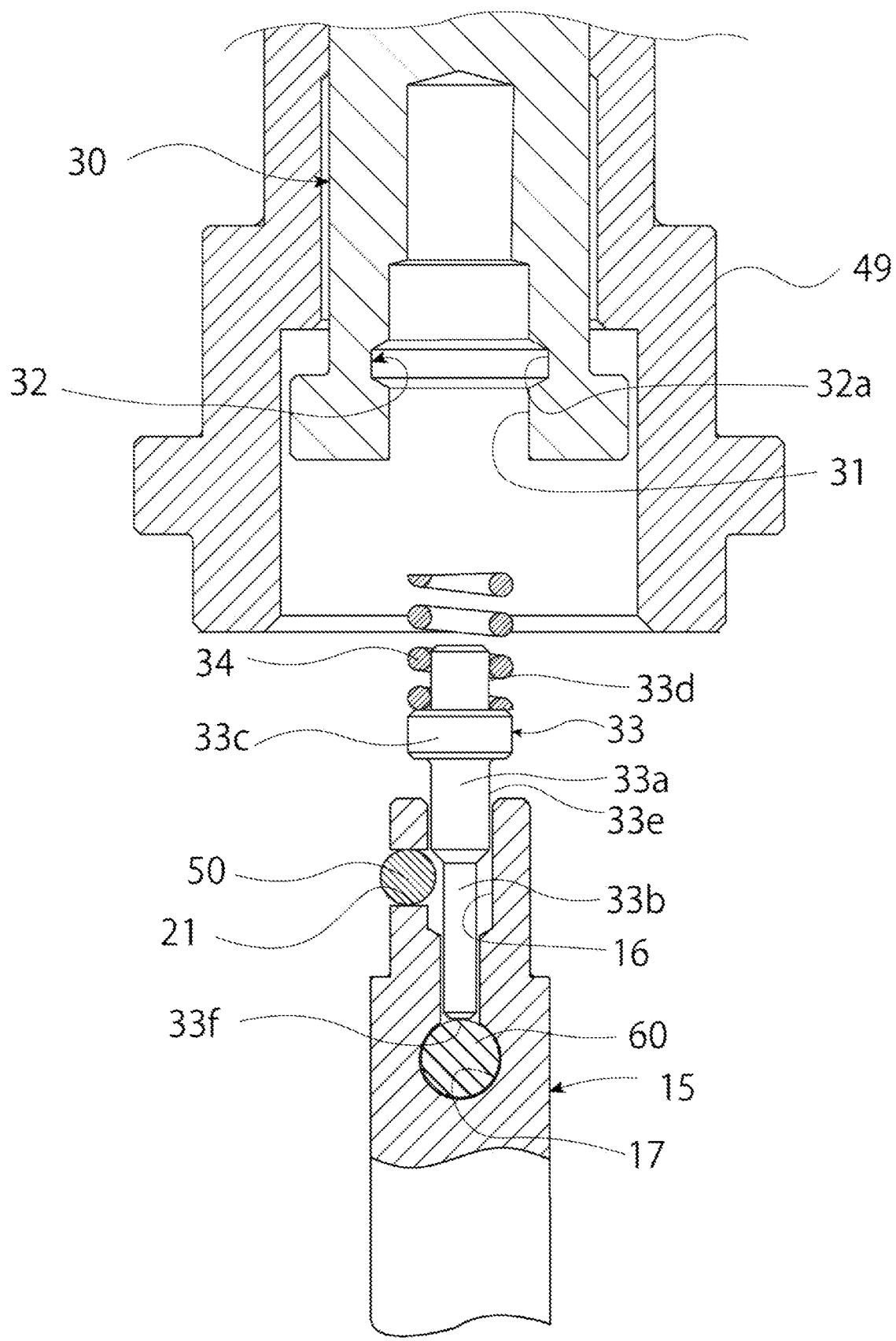
FIG. 2 is a view illustrating a state before a first stem and a second stem are assembled.

FIG. 2 illustrates a state before the first stem 15 and the second stem 30 are assembled. The first stem 15 is formed with the second recess 16 and is bored horizontally to have the through-hole 17 that leads to a bottom portion of the second recess 16. An upper portion of the first stem is bored to have the sidewall through-hole 21 that is connected to the second recess 16, and the ball 50 is arranged in the sidewall through-hole 21. It is designed that a thickness of the sidewall provided with the sidewall through-hole 21 is slightly less than a diameter of the ball 50.

The stem pin 33 includes, from above, a post section 33$d$, a flange section 33$c$, a large-diameter section 33$a$, a small-diameter section 33$b$, and a lower end surface of the small-diameter section 33$b$ is an end surface 33$f$ of the small-diameter section. A push pin 60 is inserted in the through-hole 17 and is in contact with the end surface 33$f$ of the small-diameter section.

The second stem 30 is formed with the first recess 31, and, in an inner surface thereof, is formed with the groove (annular groove) 32 that is parallel (horizontally) to an opening. A surface 32$a$ of the annular groove 32 includes a bottom surface and both inclined side surfaces of the groove. The urging member (spring) 34 for pressing the stem pin 33 downward is arranged in an upper portion of the first recess 31 (in FIG. 2, the spring 34 is fitted to the post section 33$d$ of the stem pin 33). The second stem 30 and the first stem 15, which are connected by the connection mechanism illustrated in FIG. 2, are arranged by hand in a substantially coaxial manner. Needless to say, an assembly device may be used.

Figure 3:
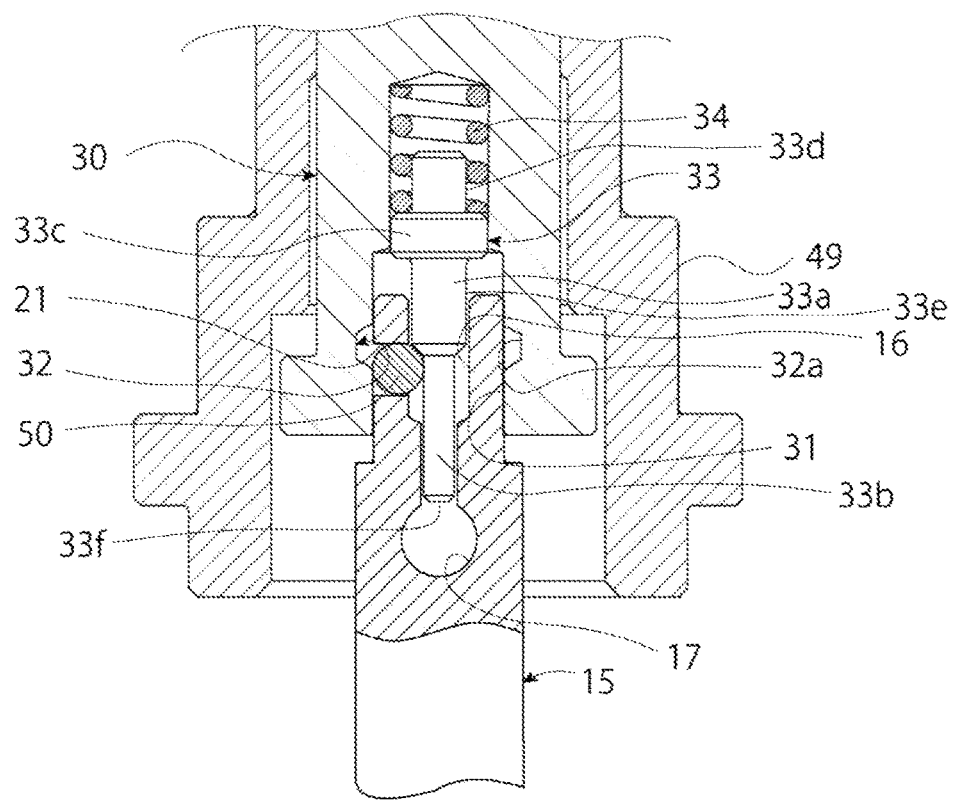
FIG. 3 is a view illustrating a state at a middle stage of assembly of the first stem and the second stem.

FIG. 3 illustrates a state where the second stem 30 and the first stem 15 are being fitted to each other. In this state, the ball 50 is not yet fitted into the annular groove 32, and coupling is not yet completed. A lower end of the spring 34 abuts and is compressed by an upper surface of the flange section 33c. At a stage where the sidewall through-hole 21 enters the first recess 31, the push pin 60 is pulled out. Even after the push pin 60 is pulled out, the ball 50 is partially present in the second recess 16, and thus the stem pin 33 does not move.

Figure 4:
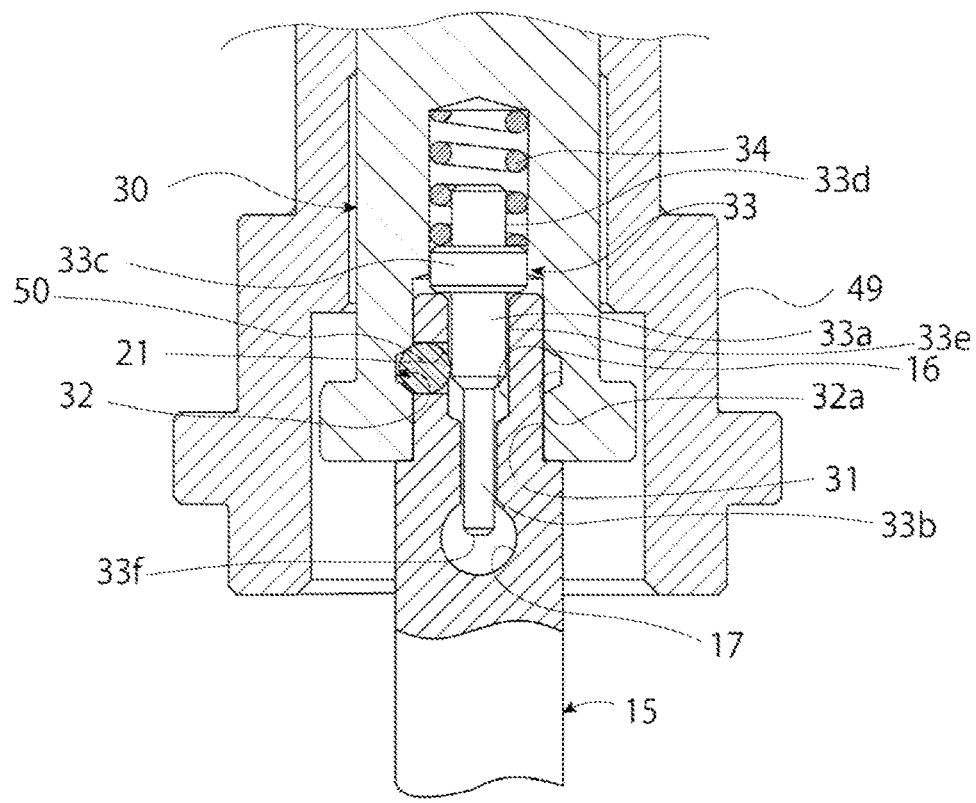
FIG. 4 is a view illustrating a state where the assembly of the first stem and the second stem is completed.

FIG. 4 illustrates a state where coupling of the second stem 30 and the first stem 15 is completed. The second stem 30 and the first stem 15 are further brought close to each other from the state in FIG. 3, the ball 50 is partially fitted into the annular groove 32, and a right side of the ball 50 contacts or is in close proximity to a surface of the large-diameter section 33a (a side surface 33e of the stem pin 33). As a result, the ball 50 is held between the surface of the large-diameter section 33a and the surface 32a of the groove, which inhibits the ball 50 from moving out of the annular groove 32. In this way, the second stem 30 and the first stem 15 are coupled. The stem pin 33 is always pressed downward by the spring 34 and thus does not move.

Figure 5:
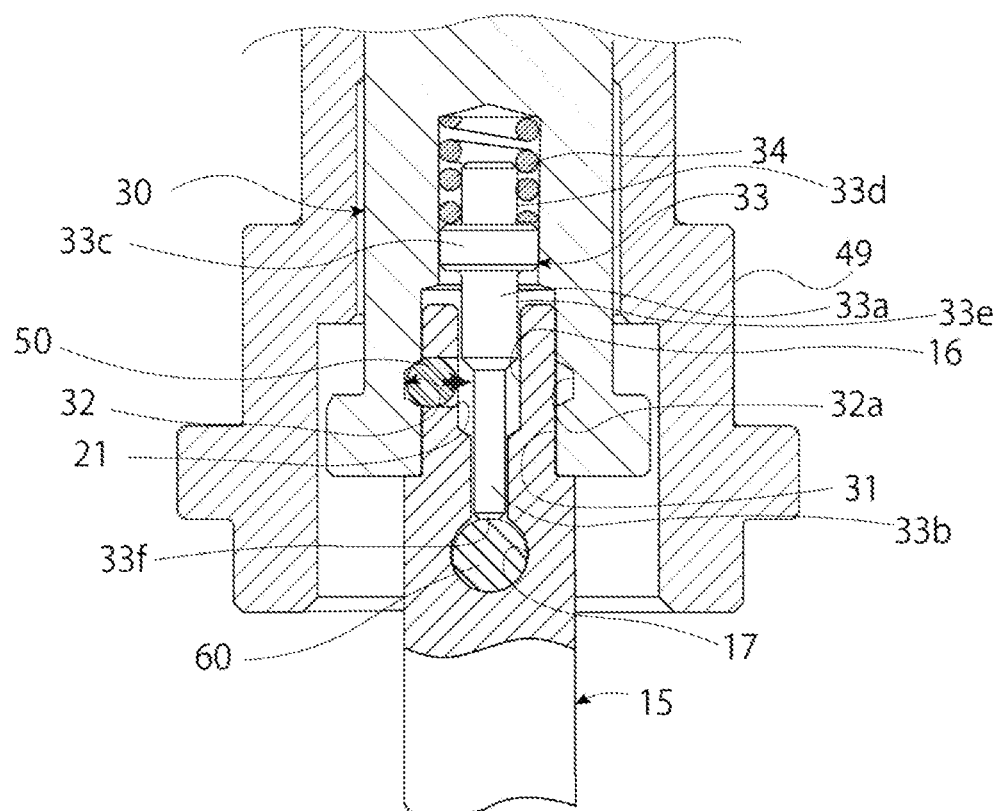
FIG. 5 is a view illustrating a state at the time when the first stem and the second stem are decoupled.
Figure 6:
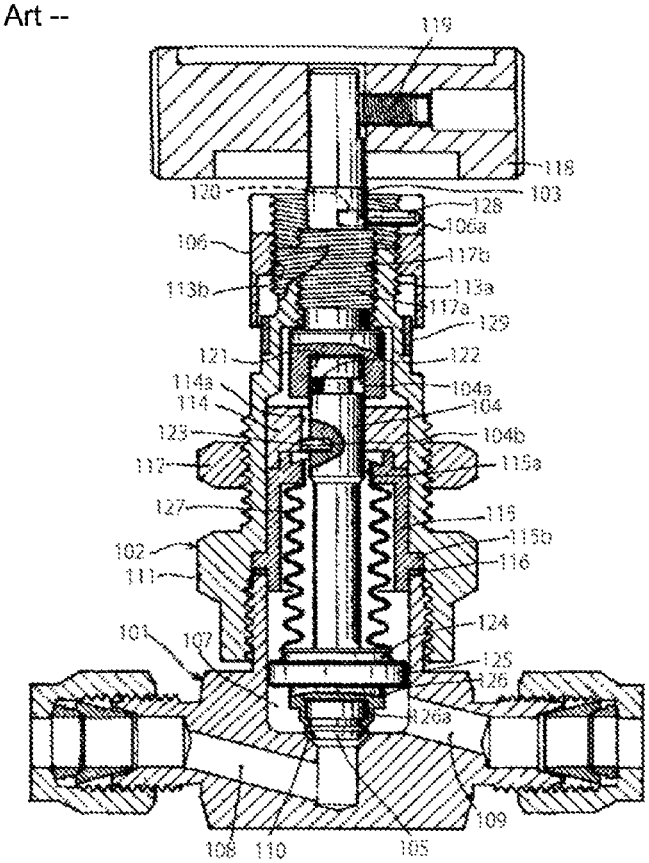
FIG. 6 is a view illustrating a conventional valve which is described in PTL 1 and in which the first stem and the second stem are coupled by a parallel pin.
Figure 7:
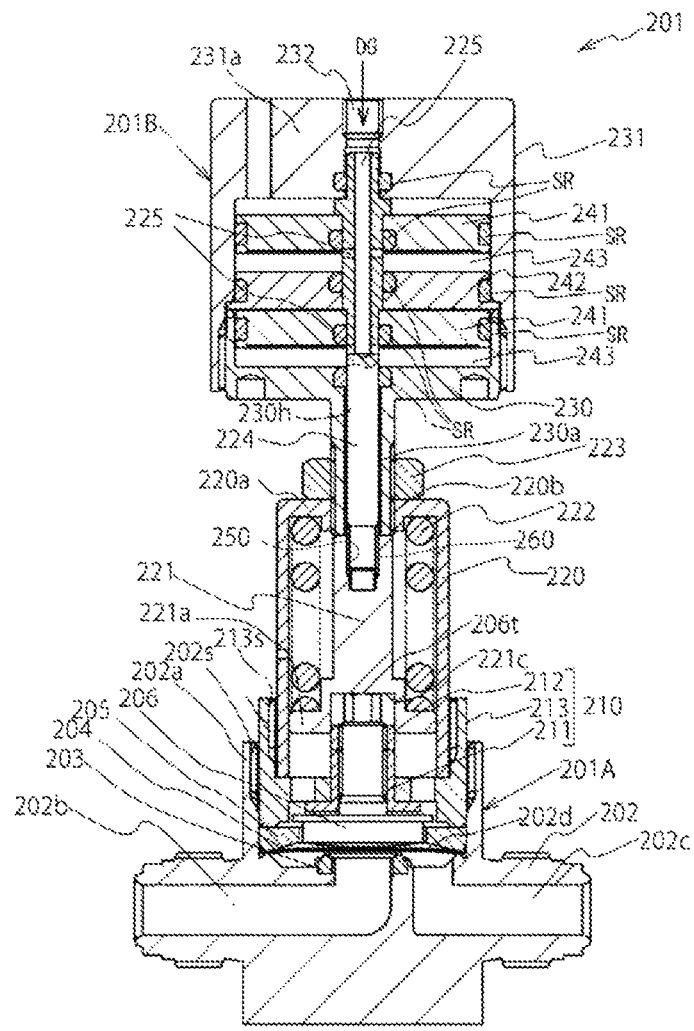
FIG. 7 is a view illustrating a conventional valve which is described in PTL 2 and in which the first stem and the second stem are coupled by screws.

FIG. 5 illustrates a method for decoupling the first stem 15 and the second stem 30, coupling of which is completed. The push pin 60 is inserted in the through-hole 17, the end surface 33f of the small-diameter section and the side surface of the push pin 60 are brought into contact with each other, and the stem pin 33 is pressed upward. Consequently, a right surface of the ball 50 moves away from the large-diameter section 33a and approaches the small-diameter section 33b. A clearance is formed between the ball 50 and the small-diameter section 33b. Thus, when the first stem 15 and the second stem 30 are pulled apart, the ball 50 moves in an arrow direction, and the first stem 15 and the second stem 30 are decoupled. This task can easily be performed by curving or sharply pointing a tip portion of the push pin 60 to have a tapered shape.

The present international application claims priority based on Japanese Patent Application No. 2020-196961, filed on Nov. 27, 2020, and the entire contents of Japanese Patent Application No. 2020-196961 are hereby incorporated into the present international application.

INDUSTRIAL APPLICABILITY

As it has been described so far, in the valve of the invention facilitates coupling of the first stem and the second stem and enables downsizing of the valve. Furthermore, the assembly and decoupling are made easier, which contributes to a cost reduction.

REFERENCE SIGNS LIST

1. Valve
2: Valve unit
3: Drive unit
10: Valve body
11: Fluid inlet channel
12: Fluid outlet channel
13: Valve seat
14: Valve body
15: First stem
16: Second recess
17: Through-hole
18: Bonnet
19: Locknut
20: Bellows
21: Sidewall through-hole
30: Second stem
31: First recess
32: Groove (annular groove)
32a: Bottom surface of groove
33: Stem pin
33a: Large-diameter section
33b: Small-diameter section
33d: Post section
33c: Flange section
33e: Side surface of stem pin
33f: End surface of small-diameter section
34: Urging member (spring)
40: Lower casing
41: Upper casing
42: Drive fluid supply port
43, 44: Piston member
45: Compression coil spring
46: Ceiling section
47: Compression coil spring receiving member
48: Cylinder head
49: Intermediate connection cylinder
50: Ball
60: Push pin

The invention claimed is:

1. A valve comprising:
a valve unit that includes a first stem having a valve body in one end portion, the valve body abutting/separating from a valve seat in a valve body that is formed with a fluid channel, so as to respectively allow/disallow a flow of a fluid; and
a drive unit that includes a second stem connected to the first stem by a connection mechanism and is attached to the valve unit, characterized in that
the connection mechanism is configured to include: a first recess that is a recess formed in either one of the second stem and the first stem and is formed with a groove at a predetermined position of an inner circumferential surface; a second recess that is formed in another one of the second stem and the first stem; a stem pin that is accommodated in the first recess; an urging member that urges the stem pin accommodated in the first recess to the another side; a sidewall through-hole that penetrates a sidewall of the second recess horizontally; and a ball that enters the sidewall through-hole, and
when a stem end portion that forms the second recess is inserted to a predetermined position in the first recess, the stem pin is urged by the urging member and arranged at a predetermined position in the second recess, the ball is held and fixed between a surface of the groove and a side surface of the stem pin, and the second stem and the first stem are connected and fixed.

2. The valve according to claim 1 further being formed with a through-hole that is connected to the second recess and penetrates the second recess in a perpendicular direction, the second stem and the first stem being disconnected by a push pin inserted in the through-hole, wherein
the stem pin has a small-diameter section on the through-hole side and further has a large-diameter section, and a contact surface with the ball at the time when the second stem and the first stem are connected and fixed is a side surface of the large-diameter section, and when the push pin is inserted in the through-hole, a side surface of the push pin pushes an end surface of the stem pin on the small-diameter section side to the urging member side, the ball in contact with the stem pin moves away from the side surface of the large-diameter section, and the second stem and the first stem are disconnected.

3. The valve according to claim 1, wherein the groove is an annular groove.

4. The valve according to claim 1, wherein the valve is a bellows valve that includes bellows.

5. The valve according to claim 2, wherein the groove is an annular groove.

6. The valve according to claim 2, wherein the valve is a bellows valve that includes bellows.

7. The valve according to claim 3, wherein the valve is a bellows valve that includes bellows.

8. The valve according to claim 5, wherein the valve is a bellows valve that includes bellows.

* * * * *